United States Patent [19]
Martins

[11] Patent Number: 6,072,298
[45] Date of Patent: Jun. 6, 2000

[54] METHOD AND APPARATUS FOR CONTROLLING A MULTI-PHASE ELECTRIC MOTOR WITH A LINEAR RATE OF CURRENT

[75] Inventor: Marcus M. Martins, Richardson, Tex.

[73] Assignee: Texas Instruments Incorporated, Dallas, Tex.

[21] Appl. No.: 09/191,816

[22] Filed: Nov. 13, 1998

Related U.S. Application Data

[60] Provisional application No. 60/065,861, Nov. 14, 1997.

[51] Int. Cl.$^7$ ........................................ H02P 5/28
[52] U.S. Cl. .................................................. 318/806
[58] Field of Search ........................ 363/97, 71, 40, 363/98; 318/439, 805, 806

[56] References Cited

U.S. PATENT DOCUMENTS

| | | | |
|---|---|---|---|
| 5,517,402 | 5/1996 | Ikeda et al. ............................. | 363/132 |
| 5,617,308 | 4/1997 | Weise et al. ............................ | 363/98 |
| 5,877,602 | 3/1999 | Kondoch et al. ...................... | 318/254 |

*Primary Examiner*—Shawn Riley
*Attorney, Agent, or Firm*—W. Daniel Swayze, Jr.; Wade James Brady, III; Richard L. Donaldson

[57] ABSTRACT

An electric motor (12) has multiple phase inputs (22, 24, 26). Each phase input can be coupled to a supply voltage (VM) by a high side driver transistor (40, 46, 52), or can be coupled to ground by a low side driver transistor (42, 48 54). A control circuit (30) turns each of the high and low side driver transistors on and off according to a predetermined sequence. As each of the low side driver transistors is turned off, another low side driver transistor is turned on in a manner so that a current through the low side driver transistor which is being turned off decreases at a linear rate, and so that a current through the low side driver transistor which is being turned on simultaneously increases at the same linear rate.

10 Claims, 4 Drawing Sheets

METHOD AND APPARATUS FOR CONTROLLING A MULTI-PHASE ELECTRIC MOTOR WITH A LINEAR RATE OF CURRENT

This application claims priority 2 under 35 U.S.C. § 119(e)(1) of provisional application Ser. No. 60/065,861 filed Nov. 14, 1997.

TECHNICAL FIELD OF THE INVENTION

This invention relates in general to control of electric motors and, more particularly, to a method and apparatus for controlling a multi-phase electric motor so as to reduce torque ripple, audible noise, and the flyback voltage generated on each motor coil as it is turned off.

BACKGROUND OF THE INVENTION

A control circuit for controlling a multi-phase electric motor typically includes an inverter circuit which has several switching circuits, each switching circuit including first and second electronic switches coupled in series across a source of power, and a node between the first and second electronic switches of each switching circuit being coupled to a respective phase input of the motor. The electronic switches are turned on and off in a predetermined sequence by the control circuit, in order to effect rotation of a spindle of the motor.

One exemplary application of such an arrangement is a control circuit for the spindle motor of a hard disk drive. The slew rate of the current during commutation between phases is of great concern. First, due to the inductance of the motor coils, the larger the rate of change of current, the larger the resulting voltage spikes. Voltage spikes can, in turn, create interference for other circuitry, such as the read channel circuits coupled to the read/write heads of the hard disk drive. Second, when the total current drawn by the inverter changes during commutation, there is more torque ripple, and there may be audible noise.

One known approach to these problems is to control the motor current during the commutation by imposing on the phase that is being turned off, in a closed loop control, a voltage which causes a non-linear change in motor current. This can potentially cause instability due to the coupling between phases, involving positive feedback. Also, due to the nonlinear change in the motor current, the flyback voltage on a coil which is being turned off can generate significant voltage spikes, which in turn can affect other circuitry. Further, the torque ripple can be undesirable high, and audible noise may even be generated. In addition, the control circuitry required to implement this approach is relatively complex.

SUMMARY OF THE INVENTION

From the foregoing, it may be appreciated that a need has arisen for a method and apparatus of controlling a multi-phase motor so as to minimize the flyback voltage generated as coils are turned off, and so as to minimize or eliminate torque ripple and audible noise.

According to the present invention, a method and apparatus are provided to address this need. The method and apparatus are for operating a motor control circuit having a plurality of switching circuits which are connected in parallel with each other across a source of power and which each have a motor phase control output for driving a respective phase input of a multi-phase motor, each of the switching circuits including first and second electronic switches which are coupled in series and which each have a control input, the switching circuits each having the motor phase control output thereof coupled to a node between the first and second switching circuits thereof. The method and apparatus involve actuating and deactuating the switching control inputs of the first and second electronic switches according to a predetermined sequence, wherein the step of actuating and deactuating includes the step of turning the second electronic switches on and off sequentially in a cyclic manner so that, as each of the second electronic switches is turned off and a successive one of the second electronic switch is turned on, a current through the second electronic switch which is being turned off decreases at a linear rate and a current through the second electronic switch which is being turned on simultaneously increases at the linear rate.

BRIEF DESCRIPTION OF THE DRAWINGS

A more complete understanding of the present invention will be apparent from the detailed description below, taken in conjunction with the accompanying drawings, in which.

DETAILED DESCRIPTION OF THE INVENTION

Figure 1:
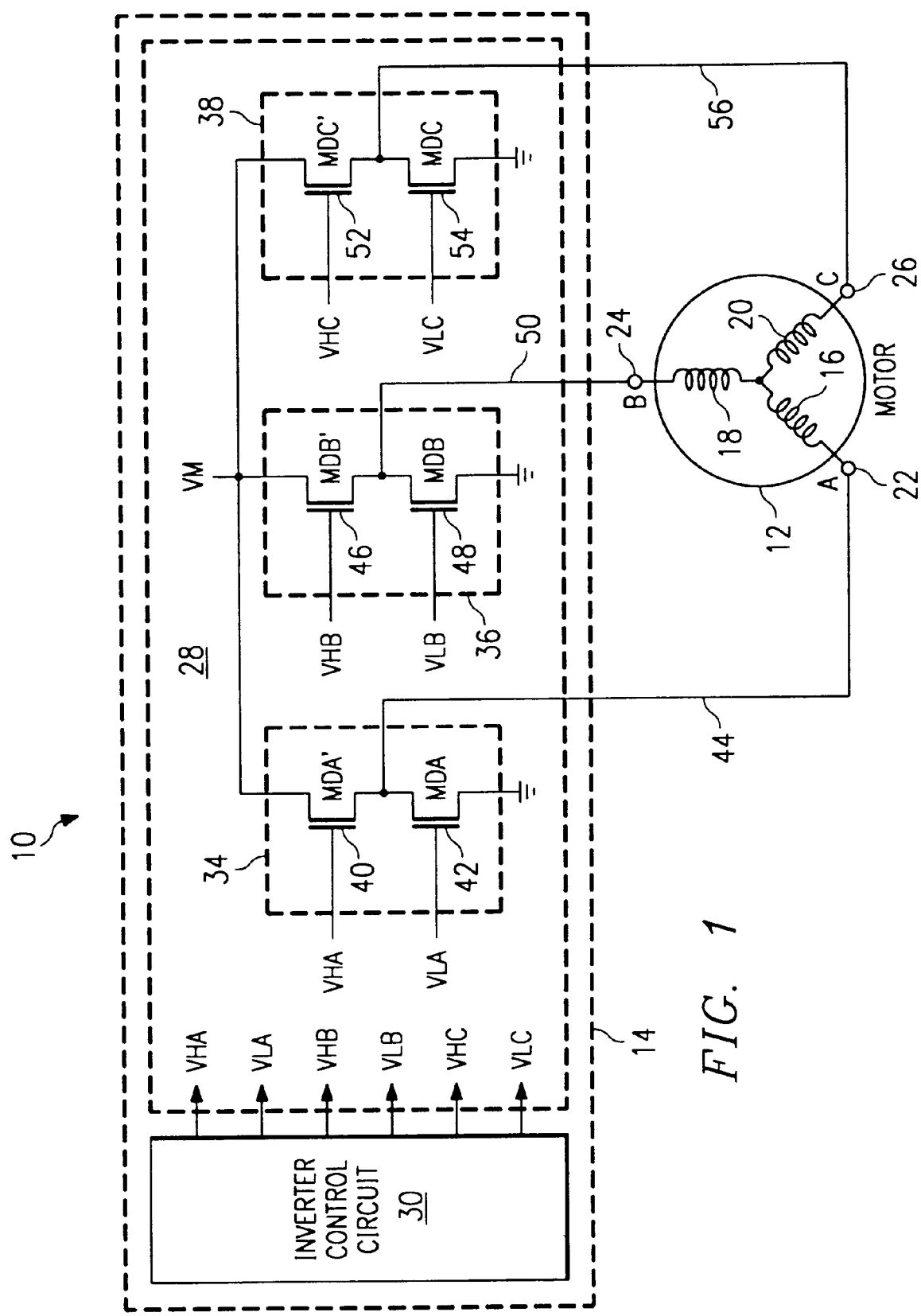
FIG. 1 is a block diagram of a system which includes a multi-phase electric motor and a control circuit for controlling the motor.

FIG. 1 is a block diagram of a system 10 which embodies the present invention. The system 10 includes a multi-phase electric motor 12, and a motor control circuit 14. In the disclosed embodiment, the system 10 is a hard disk drive device, and 12 is the spindle motor which rotates the magnetic disks of the drive. However, the invention is entirely suitable for controlling multi-phase electric motors in other types of systems.

The electric motor 12 is a three-phase motor, although the invention is not limited to a three-phase motor. The three-phase motor 12 is itself conventional, and includes three coils 16, 18 and 20 which are each connected to a respective phase input 22, 24 and 26 of the motor 12. The phase inputs 22, 24 and 26 are sometimes referred to herein as phases A, B, and C.

The motor control circuit 14 includes an inverter circuit 28 and an inverter control circuit 30. The inverter circuit 28 is also sometimes referred to in the art as a driver circuit, but the term inverter circuit is used herein in order to avoid confusion with other disclosed driver circuits. The inverter circuit 28 includes three switching circuits 34, 36 and 38, which are each connected between ground and a DC supply voltage VM. The switching circuit 34 includes two electronic switches 40 and 42, which each include a transistor. The drain of transistor 40 is coupled to the supply voltage VM, the source of the transistor 40 is coupled to the drain of transistor 42, and the source of transistor 42 is coupled to ground. The gate of transistor 40, which serves a control input, is driven by a control signal VHA from the inverter control circuit 30. Similarly, the gate of transistor 42, which serves as a control input, is controlled by a signal VLA from the inverter control circuit 30. The drain of transistor 42 serves as a motor phase control output 44 from the inverter circuit 28 and from the motor control circuit 14, and is coupled to the input 22 for phase A of the motor 12. In the disclosed embodiment, the electronic switches 40 and 42 each include a transistor, but it will be recognized that other suitable electronic switching devices could alternatively be used.

The switching circuits 36 and 38 are each similar to the switching circuit 34 in the disclosed embodiment. In particular, the switching circuit 36 includes two electronic switches 46 and 48 which are transistors coupled in series between ground and the supply voltage VM, and which have gates serving as control inputs that are driven by respective signals VHB and VLB from the inverter control circuit 30. The drain of transistor 48 serves as a motor phase control output 50 from the inverter circuit 28 and the control circuit 14, the motor phase control output 50 being coupled to the input 24 for phase B of the motor 12.

Likewise, the switching circuit 38 includes two electronic switches 52 and 54 which are transistors coupled in series between ground and the supply voltage VM, and which have gates serving as control inputs driven by respective signals VHC and VLC from the inverter control circuit 30. The drain of transistor 54 serves as a motor phase control output 56 which is coupled to the input 26 for phase C of the motor 12. The transistors 40, 46 and 52, which are coupled between the supply voltage VM and respective phase inputs of the motor, are sometimes referred to as the high side drivers. The transistors 42, 48 and 54, which are coupled between ground and respective motor phase inputs, are sometimes referred to as the low side drivers.

Figure 2:
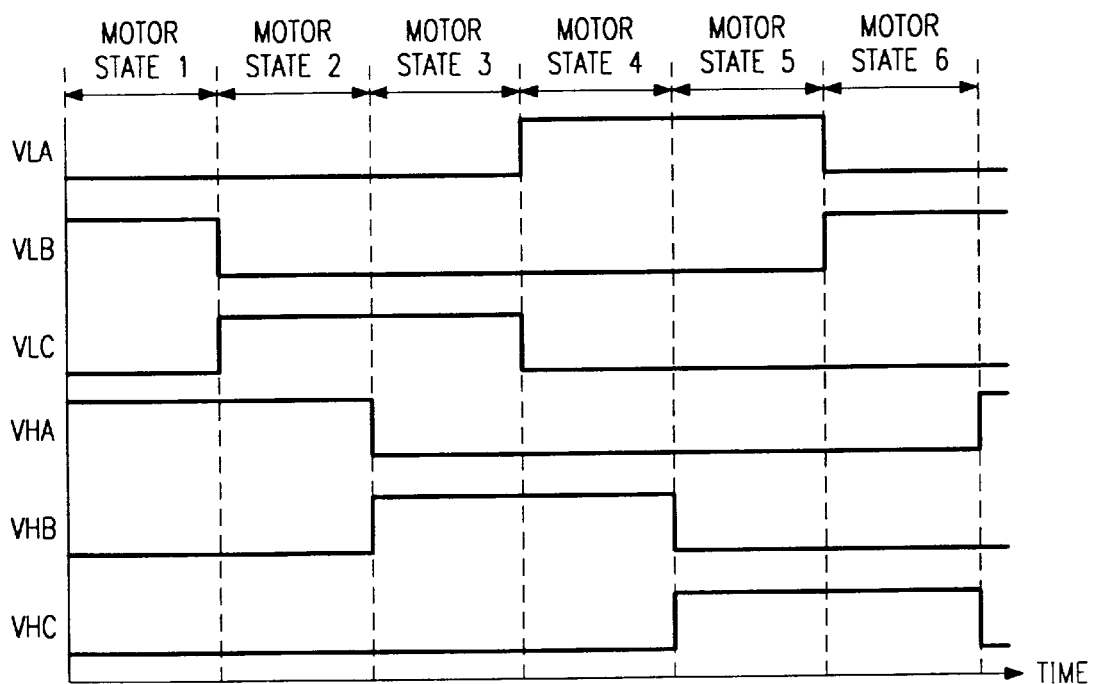
FIG. 2 is a timing diagram showing the relationship of certain control signals generated by the control circuit of FIG. 1.

In order to effect rotation of a not-illustrated spindle of motor 12, the inverter control circuit 30 implements a predetermined sequence of switching the signals VHA, VLA, VHB, VLB, VHC and VLC. This predetermined sequence is illustrated in FIG. 2. The predetermined sequence is cyclic, and has six states which in FIG. 2 are identified as motor states 1–6. With reference to FIGS. 1 and 2, it will be noted that the high side driver transistor 40 is turned on by signal VHA during motor states 1 and 2, the high side driver transistor 46 is turned on by signal VHB during motor states 3 and 4, and the high side driver transistor 52 is turned on by signal VHC during motor states 5 and 6. Motor state 6 is followed by motor state 1, such that the six-state cycle repeats endlessly during normal operation of the motor 12. Thus, just one of the high side driver transistors 40, 46 and 52 is on during any given motor state. These three transistors are successively and mutually exclusively turned on in an endless cycle, each of the high side driver transistors being turned off as another of the high side driver transistors is turned on.

Similarly, the low side driver transistor 42 is turned on by signal VLA during motor states 4 and 5, the low side driver transistor 48 is turned on by signal VLB during motor states 6 and 1, and the low side driver transistor 54 is turned on by signal VLC during motor states 2 and 3. The transistors 42, 48 and 54 are thus turned on successively and mutually exclusively in a cyclic manner, wherein as each transistor is turned off another transistor is turned on. As evident from FIG. 2, the points in time at which the low side driver transistors turn on and off are offset from the points in time at which the high side driver transistors turn on and off.

More specifically, FIGS. 1 and 2 show that, during motor state 1, the high side driver transistor 40 and the low side driver transistor 48 are turned on, and the other driver transistors are off, such that current flows in sequence through transistor 40, coil 16, coil 18 and transistor 48. In motor state 2, the high side driver transistor 40 and the low side driver transistor 54 are turned on, and the other driver transistors are off, such that current flows successively through transistor 40, coil 16, coil 20 and transistor 54. In motor state 3, the high side driver transistor 46 and the low side driver transistor 54 are turned on, and the other driver transistors are off, such that current flows successively through transistor 46, coil 18, coil 20, and transistor 54. Similarly, in motor state 4, the high side driver transistor 46 and the low side driver transistor 42 are turned on, and the other driver transistors are off, such that current flows successively through transistor 46, coil 18, coil 16 and transistor 42. In motor state 5, the high side driver transistor 52 and the low side driver transistor 42 are turned on, and the other driver transistors are off, such that current flows successively through transistor 52, coil 20, coil 16 and transistor 42. Finally, in motor state 6, the high side driver transistor 52 and the low side driver transistor 48 are turned on, and the other driver transistors are off, such that current flows successively through transistor 52, coil 20, coil 18 and transistor 48. The term commutation is typically used to refer to an event where one driver transistor is turned off while another driver transistor is turned on, in order to turn off current flow through one motor coil while turning on current flow through another motor coil.

For convenience and simplicity, the control signals of FIG. 2 are shown as idealized square-wave signals. However, it will be recognized that it actually takes a brief but finite amount of time for each of the signals of FIG. 2 to change state. Pursuant to the present invention, inverter control circuit 30 controls the signals VLA, VLB and VLC, which respectively drive the low side driver transistors 42, 48 and 54, in a manner so that as each of these transistors is turned off the current therethrough decreases at a constant rate, and so that the current through another low side driver transistor which is being turned on simultaneously increases at the same rate. Consequently, the total current flowing from the source which generates supply voltage VM is a substantially constant current during commutation of the low side driver transistors. In theory, it would be possible to closely regulate the operation of the high side driver transistors 40, 46 and 52. However, since the total current flowing through the high side driver transistors 40, 46 and 52 is always necessarily equal to the total current flowing through the low side driver transistors 42, 48 and 54, it is sufficient to regulate just the low side driver transistors 42, 48 and 54. The manner in which the inverter control circuit 30 controls the low side driver transistors 42, 48 and 54 in accord with the present invention will now be described.

Figure 3:
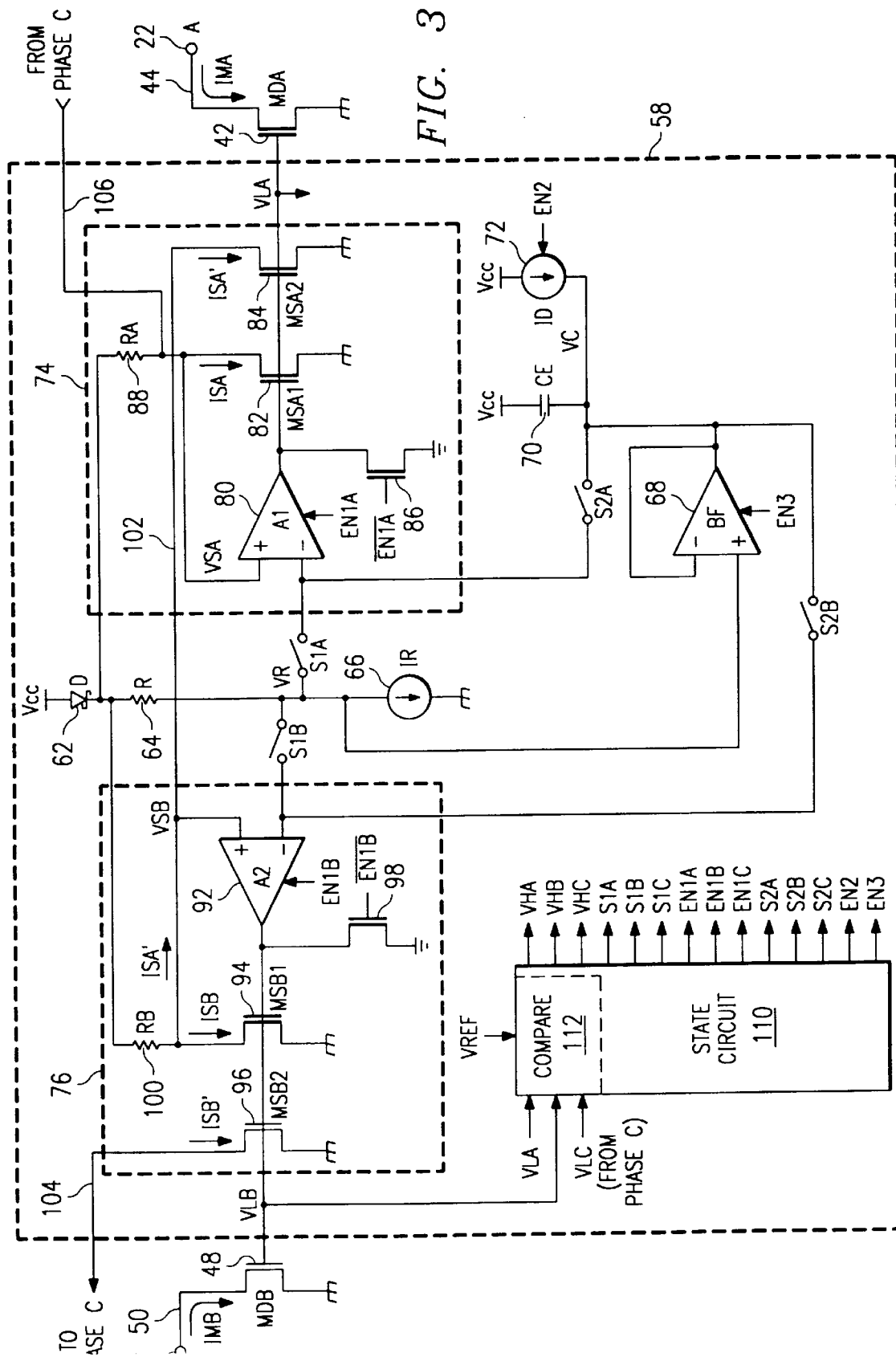
FIG. 3 is a schematic diagram of a portion of the control circuit of FIG. 1.

FIG. 3 depicts a circuit portion 58, which is a portion of the inverter control circuit 30 of FIG. 1. In this regard, and as discussed below, the circuit portion 58 shows certain circuitry provided for the motor phases A and B, but for convenience and clarity omits equivalent circuitry provided for the motor phase C. FIG. 3 also shows the low side driver transistors 42 and 48 of the inverter 28 of FIG. 1, which respectively provide the motor phase control outputs 44 and 50 that drive the inputs 22 and 24 for motor phases A and B. FIG. 3 also shows the signals VLA and VLB, which have been discussed above in association with FIGS. 1 and 2, and which each control a respective one of the transistors 42 and 48.

The circuit portion 58 includes a diode which is designated by reference numeral 62, and which has its anode coupled to a supply voltage VCC and its cathode coupled to one end of a resistor designated by reference numeral 64. The other end of the resistor 64 is coupled to ground through a current source circuit IR designated by reference numeral 66. A not-illustrated circuit, which is conventional and known to those skilled in the art, monitors the actual motor speed and controls the current source circuit 66 so as to set the current therethrough, which in turn determines the speed of the motor. Absent any significant changes in load, the motor will run at a constant speed if the current flowing through the current source circuit 66 remains constant. Thus, the voltage VR at the lower end of resistor 64 is a constant voltage for a given motor speed.

A buffer circuit BF designated by reference numeral 68 has an input coupled to the lower end of resistor 64 and thus the voltage VR, and has a further input coupled to the buffer circuit output. The buffer circuit 68 is selectively actuatable under control of a control signal EN3. When the buffer circuit 68 is enabled by the signal EN3, the voltage VR present at the input of buffer circuit 68 is supplied to the output of the buffer circuit. When the buffer circuit 68 is disabled by the signal EN3, the buffer circuit 68 has a tri-state output.

The circuit portion 58 also includes a capacitor CE, which is designated by reference numeral 70 and which is coupled between the supply voltage VCC and the output of the buffer circuit 68. The circuit portion 58 further includes a constant current source circuit ID which is designated by reference numeral 72, and which is coupled between the supply voltage VCC and the output of buffer circuit 68. The current source circuit 72 is selectively actuatable under control of a signal EN2.

The buffer circuit 68 and current source circuit 72 are not actuated at the same time. When the buffer circuit 68 is actuated, it applies the voltage VR to one end of the capacitor 70 so as to charge the capacitor 70. In particular, when the buffer circuit is enabled, it charges the capacitor 70 to a voltage which is VCC minus VR. When the buffer circuit 68 is thereafter disabled and the current source circuit 72 is enabled, the constant current source 72 discharges the capacitor 70 at a constant rate determined by the constant rate of current flow through the constant current source circuit 72. The voltage across the capacitor 70 thus decreases at a constant rate, which in turn causes the voltage VC at the output of the buffer circuit 68 to ramp up at a constant rate. Since at this time the buffer circuit 68 is disabled, and its output is tri-stated, the buffer circuit 68 has no effect on the signal generated at its output by the current source 72 and capacitor 70.

The circuit portion 58 further includes three switching control sections, two of which are shown in FIG. 3 at 74 and 76. The switching control sections 74 and 76 are respectively associated with the motor phases A and B, and it will be noted that each generates a respective one of the signals VLA and VLB associated with the low side driver transistors 42 and 48. A similar switching control section is provided for the motor phase C, but for convenience and clarity is not shown in FIG. 3.

The switching control section 74 is comprised of an amplifier A1 designated by reference numeral 80, a sense transistor MSA1 designated by reference numeral 82, a further sense transistor MSA2 designated by reference numeral 84, a shutoff transistor designated by reference numeral 86, and a resistor RA designated by reference numeral 88. The amplifier 80 is selectively actuatable, under control of a signal EN1A. The signal output by amplifier 80 is the previously-discussed control signal VLA for the low side driver transistor 42 for motor phase A, and in particular is coupled to the gate of transistor 42. The sense transistors 82 and 84 each have a gate which serves as a control input and which is coupled to the output of the amplifier 80, and each have a source which is coupled to ground. Since the transistors 82, 84 and 42 each have a source coupled to ground and a gate coupled to the output of amplifier 80, the current flow through these transistors is proportional, in dependence on the widths and lengths of the respective channels of these three transistors. In the disclosed embodiment, the transistor 42 has a channel length of 0.8 microns and a channel width of 20,000 microns, whereas the sense transistors 82 and 84 each have a channel length of 0.8 microns and a channel width of 20 microns. Thus, in the disclosed embodiment, the current flow through the transistor 42 is about one thousand times the current flow through each of the sense transistors 82 and 84.

The amplifier 80 has one input which is coupled to the drain of sense transistor 82, and also to the end of resistor 88 which is remote from diode 62. The amplifier 80 has a further input which is coupled by an electronic switch S1A to the end of resistor 64 which is remote from diode 62, and through an electronic switch S2A to the node between capacitor 70 and the output of buffer circuit 68. The electronic switches S1A and S2A can be implemented with conventional switching transistors or other suitable electronic switching elements.

The shutoff transistor 86 has its drain coupled to the output of amplifier 80, and its source coupled to ground. The gate of transistor 86 serves a control input, and is coupled to the inverse of the control signal EN1A for the amplifier 80. Thus, when the signal EN1A is disabling the amplifier 80, the shutoff transistor 86 is turned on and forces the output of the amplifier 80 substantially to ground, in order to ensure that the low side motor driver transistor 42 for motor phase A is completely turned off.

The switching control section 76 for motor phase B is equivalent to the switching control section 74. In particular, it includes an amplifier A2 designated by reference numeral 92, a sense transistor MSB1 designated by reference numeral 94, a further sense transistor MSB2 designated by reference numeral 96, a shutoff transistor designated by reference numeral 98, and a resistor RB designated by reference numeral 100. The amplifier 92 has an input which can be coupled by electronic switch S1B to the end of resistor 64 remote from diode 62, and by an electronic switch S2B to the node between capacitor 70 and the output of buffer circuit 68. The output of amplifier 92 is, of course, the signal VLB controlling the low side motor driver transistor 48 for the phase B input of the motor 12.

The not-illustrated switching control section for motor phase C is similar to the switching control sections 74 and 76, and includes a not-illustrated amplifier which can be coupled to the end of resistor 64 remote from the diode 62 by a not-illustrated electronic 30 switch SIC functionally similar to the switches S1A and S1B, and which can be coupled to the node between capacitor 70 and buffer circuit 68 by a not-illustrated electronic switch S2C functionally similar to the switches S2A and S2B.

In the disclosed embodiment, the resistors 88 and 100 in switching control sections 74 and 76, as well as the comparable and not-illustrated resistor in the switching control section for motor phase C, each have a resistance equal to the resistance of resistor 64. However, the resistors in the switching control sections could have a resistance different from the resistance of resistor 64.

As shown in FIG. 3, the sense transistor 84 in the switching control section 74 for phase A has its drain coupled at 102 to the drain of sense transistor 94 in the switching control section 76 for phase B, the sense transistor 96 in the switching control section 76 for phase B has its drain coupled at 104 to the drain of a not-illustrated sense transistor in the not-illustrated switching control section for phase C, and a not-illustrated sense transistor in the not-illustrated switching control section for phase C has its drain coupled at 106 to the drain of the sense transistor 82 in the switching control section 74 for phase A.

The circuit portion 58 also includes a state circuit 110 which generates the control signals VHA, VHB and VHC for the high side driver transistors 40, 46 and 52 (FIG. 1), signals S1A, S1B and S1C which respectively control the open or closed state of the electronic switches S1A, S1B and S1C, signals S2A, S2B and S2C for controlling the open and closed states of the respective electronic switches S2A, S2B and S2C, signals EN2 and EN3 for respectively controlling the current source circuit 72 and buffer circuit 68, the signal EN1A for controlling the amplifier 80 and shutoff transistor 86 for motor phase A, the signal EN1B for controlling the amplifier 92 and shutoff transistor 98 for the motor phase B, and a signal EN1C for controlling the not-illustrated amplifier and shutoff transistor for motor phase C. The state circuit 110 also receives as inputs the signal VLA produced by the switching control section 74, the signal VLB produced by the switching control section 76, and the signal VLC produced by the non-illustrated switching control section for motor phase C.

Figure 4:
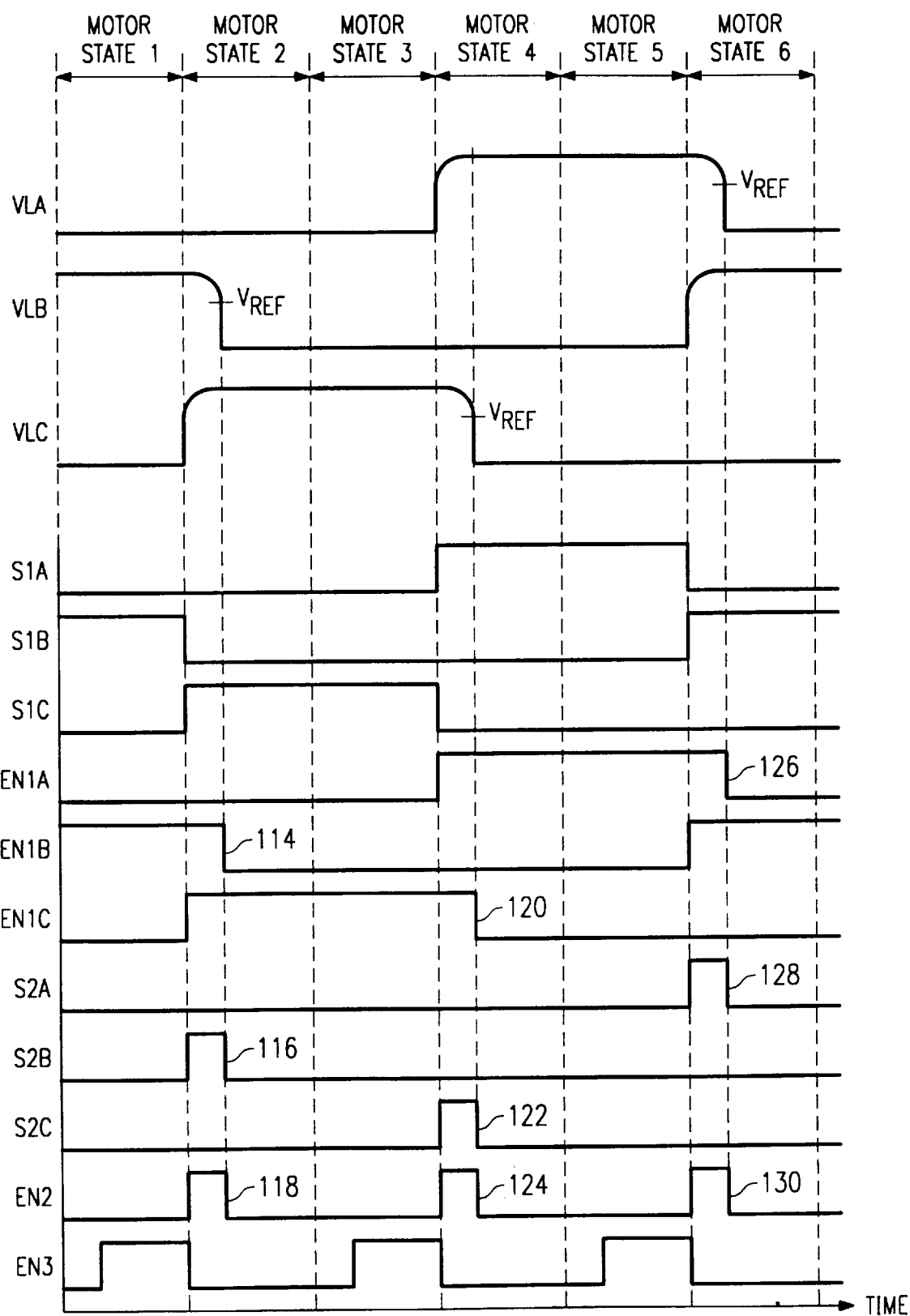
FIG. 4 is a timing diagram showing certain signals generated in the circuit of FIG. 3.

As to the production by state circuit 110 of the high side driver signals VHA, VHB and VHC, the timing of these three signals has already been described above in association with the timing diagram of FIG. 2. The timing diagram of FIG. 4 shows the relationship of the remaining signals generated by the state circuit 110. In addition, FIG. 4 shows the actual waveforms of the signals VLA, VLB and VLC, and how they relate to signals generated by the state circuit 110. The top of FIG. 4 identifies the six states of the motor 12. It should be noted that the six states identified at the top of FIGS. 2 and 4 represent states of the motor 12, as distinguished from states of the state circuit 110. It will also be noted that the signals in FIG. 4, like the signals in FIG. 2, are generated in a cyclic sequence, in which the signal states associated with motor state 1 immediately follow the signal states associated with motor state 6.

The state circuit 110 includes a compare circuit section 112, which compares each of the signals VLA, VLB and VLC to a predetermined reference voltage VREF, which is a very low voltage. As each of the signals VLA, VLB and VLC is turned off, the compare circuit section 112 determines when that signal has dropped below the reference voltage VREF, and then changes state in order to effect a transition of certain output signals. More specifically, with reference to FIG. 4 and a situation where the signal VLB is being turned off, the signal transitions 114, 116 and 118 are effected when the signal VLB is being turned off and the signal VLB drops below the reference voltage VREF, the signal transitions 120, 122 and 124 are effected when the signal VLC is being turned off and drops below the reference voltage VREF, and the signal transitions 126, 128 and 130 are effected when the signal VLA is being turned off and drops below the reference voltage VREF.

The operation of the system 10 of FIG. 1 will now be briefly described. During motor state 5 (FIGS. 2 and 4), the signals VHC and VLA are enabled, in order to turn on high side driver transistor 52 and the low side driver transistor 42. Current thus flows successively through high side driver 52, motor coil 20, motor coil 16, and low side driver transistor 42. The other signals VHA, VHB, VLB and VLC are turned off, so that the transistors 40, 46, 48 and 54 are all turned off. During motor state 5, and as evident from FIG. 4, the electronic switch S1A is closed, and the electronic switches S1B, S1C, S2A, S2B and S2C are all open. Further, the enable signal EN1A is actuated, whereas the enable signals EN1B and EN1C are disabled. Thus, the amplifier 80 for motor phase A is enabled and the associated shutoff transistor 86 is turned off, and the voltage VR is applied through S1A to the input of amplifier 80.

Amplifier 80 therefore actuates the signal VLA in order to turn on the low side motor driver transistor 42, as shown in FIG. 4. At the same time, the amplifier 92 for phase B is disabled and the associated shutoff transistor 98 is enabled, so that the signal VLB produced by the amplifier 92 is substantially at ground and turns off the motor driver transistor 48 for phase B, as shown in FIG. 4. Similarly, in the not-illustrated switching control section for phase C, the amplifier is disabled and the associated shutoff transistor is turned on, so that the signal VLC is substantially at ground and the associated low side driver transistor 54 is turned off. As evident from FIG. 4, the switch S2A between the capacitor 70 and amplifier 80 is open, the switch S2B between the capacitor 70 and amplifier 92 is open, and the switch S2C between the capacitor 70 and the amplifier for phase C is open. The current IR flowing through the resistor 64 thus sets the voltage VR, which is applied through electronic switch S1A to the input of amplifier A1. Since the resistors 64 and 88 have the same resistance, the amplifier 80 forces the current ISA through sense transistor 82 to be equal to the current IR. Further, due to the mirror configuration between transistors 82 and 42, a current IMA, which is approximately one thousand times the current ISA, will flow through the transistor 42.

At a point between the start and end of motor state 5, is as shown in FIG. 4, the signal EN3 is turned on in order to enable the buffer circuit 68. The buffer circuit 68 then brings its output to the voltage VR which is present at its input, such that the capacitor 70 is charged to a voltage of VCC minus VR. During this time, the signal EN2 is off, so that the current source 72 is disabled.

The transition from motor state 5 to motor state 6 corresponds to turning off the low side driver transistor 42 for motor phase A while turning on the low side driver transistor 48 for motor phase B. In particular, at the end of state 5, the state circuit 110 opens the electronic switch S1A and closes the electronic switches S2A and S1B. Thus, the voltage VR is no longer applied through switch S1A to the input of amplifier 80, but the voltage VC from capacitor 70, which is initially equal to voltage VR, is supplied through switch S2A to the input of amplifier 80. The voltage VR is applied through S1B to the input of amplifier 92. At the same time, the state circuit 110 turns off the enable signal EN3 to the buffer circuit 68, in order to disable buffer circuit 68 and thus cause the buffer circuit 68 to tri-state its output, and simultaneously turns on the enable signal EN2 to the constant current source 72. Thus, the current source 72 draws current or charge from the capacitor 70 at a constant rate, so that the voltage VC provided from one end of capacitor 70 to amplifier 80 starts from a voltage substantially equal to VR and then ramps up at a constant rate, which causes the amplifier 80 to change the voltage VLA in a manner causing the driver transistor 42 to turn off at a constant rate the current flowing therethrough. Consequently, the current IMA through the driver transistor 42 decreases at that constant rate. The amplifier 80 forces the voltage VSA at one input to follow the voltage VC applied from the capacitor 70 to its other input, such that the voltage VSA changes linearly and the current ISA decreases linearly. This can be expressed mathematically as follows, where F is the ratio of the respective currents through the transistors 42 and 82:

$$\frac{d\,ISA}{dt} = -\frac{1}{RA} \cdot \frac{d\,VSA}{dt} = -\frac{1}{R} \cdot \frac{d\,VC}{dt} = -\frac{1}{R} \cdot \frac{ID}{CE}$$

$$\frac{d\,IMA}{dt} = F \cdot \frac{d\,ISA}{dt} = -\frac{F \cdot ID}{R \cdot CE} = Ka$$

Thus, the current IMA through the transistor 42 decreases with a constant slew rate Ka, where Ka is a constant. Diode 62 ensures that the current ISA goes to zero before VC reaches VCC, in order to prevent two things. First, this prevents the current through current source ID from going to zero as a result of the voltage across it going to zero. Second, when ISA should be zero, it prevents a residual current ISA due to the offset of A1 which would occur if RA were connected directly to VCC rather than to the diode 62.

Eventually, the voltage VLA will drop below the reference voltage VREF (FIG. 4), and the compare circuit section 112 will detect this and cause the state circuit 110 to turn off the signals EN1A, S2A and EN2, as shown at 126, 128 and 130 in FIG. 4, thereby disabling the amplifier 80 and turning on the shutoff transistor 86 in order to force the signal VLA substantially to ground so as to completely turn off the transistor 42. The opening of switch S2A disconnects the amplifier 80 for phase A from the capacitor 70, and turning off the signal EN2 turns off the current source 72.

As mentioned above, the switch S1B was closed at the end of motor state 5. This applies the voltage VR to an input of the amplifier 92 for phase B, causing the amplifier 92 to attempt to increase the voltage VLB which controls the low side driver transistor 48 for phase B. However, due to the mirror configuration of sense transistors 82 and 84, sense transistor 84 forces a current ISA' to flow through resistor 100 and transistor 84. The amplifier 92 forces the voltage VSB at one of its inputs to equal the voltage VR at the other input. Therefore, as the voltage VC increases and causes the amplifier 80 to decrease current ISA', the amplifier 92 causes the current ISB through sense transistor 94 to start from zero and ramp up until it equals the current IR through the resistor 64. Expressed mathematically, where Kb is a constant:

$$VSB = VR, \text{ so } (ISB + ISA') \cdot RB = IR \cdot R.$$

But $RB = R$, so $ISB + ISA' = IR = Kb$.

Thus, $\frac{d(ISB + ISA')}{dt} = 0$, so $\frac{d\,ISB}{dt} = -\frac{d\,ISA'}{dt}$ Since $ISA' = ISA$, $\frac{d\,ISB}{dt} = -\frac{d\,ISA}{dt}$.

In terms of IMB and IMA we have the following, where F is the ratio of the current flows through the respective transistors 48 and 94:

$$\frac{d\,IMB}{dt} = F \cdot \frac{d\,ISB}{dt} = -F \cdot \frac{d\,ISA}{dt} = -\frac{d\,IMA}{dt}$$

Thus, the current IMB through the motor driver transistor 48 is turned on at the same slew rate that the current IMA through the driver transistor 42 for phase A is turned off.

In a subsequent commutation where the transistor 48 for phase B is turned off and the transistor 54 for phase C is turned on, corresponding to the transition from motor state 1 to motor state 2, an analogous signal sequence occurs in the circuits controlling the transistor 48 and 54. Similarly, when the transistor 54 for phase C is turned off and the transistor 42 for phase A is turned on, corresponding to a transition from motor state 3 to motor state 4, an analogous signal sequence is carried out.

The present invention provides numerous technical advantages. As each of the low side driver transistors 42, 48 and 54 is turned off, another one of these transistors is turned on in a manner so that the currents through the two transistors respectively decrease and increase with the same slew rate. As a result, there is a well controlled and constant rate of change in the current through each low side driver transistor, and the total current flowing through the inverter 28 of FIG. 1 remains substantially constant. This minimizes the current ripple and torque ripple. Further, with a constant rate of current change, the flyback voltage generated on the motor coil being turned off is minimized for a certain interval of time during commutation, which makes the commutation more efficient and avoids large voltage spikes that can in turn create noise in other circuits associated with the system of FIG. 1. Moreover, the approach according to the invention has the advantage of avoiding unnecessary complexity.

Although one embodiment has been illustrated and described detail, it should be understood that various and numerous changes, substitutions and alterations can be made therein without departing from the scope of the present invention. For example, although the control circuit shown and described herein uses a state circuit to generate various control signals, the control signals could be generated by a different arrangement such as a microprocessor-based circuit. Similarly, although the disclosed embodiment uses resistors which all have the same resistance, the resistors in the plural switching control sections could have a resistance which differs from the resistance of the other resistor. Further, although a particular value has been disclosed for the ratio between the current through each low side driver transistor and each of the associated sense transistors, it will be recognized that other ratios could be utilized without departing from the scope of the present invention.

It should also be recognized that direct connections disclosed herein could be altered, such that two disclosed components or elements are coupled to one another through an intermediate device or devices without being directly connected, while still realizing the present invention. Other changes, substitutions and alterations are also possible without departing from the spirit and scope of the present invention, as defined by the following claims.

What is claimed is:

1. An apparatus for controlling a motor which has a plurality of phase inputs, comprising:

a plurality of switching circuits each having a motor phase control output for a respective motor phase input, said switching circuits being coupled in parallel with each other across a source of power, wherein each said switching circuit includes first and second electronic switches which are coupled in series and which each have a control input, and wherein each said switching circuit has said motor phase control output thereof coupled to a node between said first and second electronic switches thereof; and a control circuit having a plurality of switching control outputs which are each coupled to said control input of a respective said electronic switch, said control circuit being operable to actuate and deactuate said switching control outputs in a predetermined sequence, said predetermined sequence including control of said switching control outputs for said second electronic switches in a manner causing said second electronic switches to turn on and off sequentially in a cyclic manner so that, as each said second electronic switch is turned off and another said second electronic switch is turned on, a current through the second electronic switch which is being turned off decreases at a linear rate and a current through the second electronic switch which is being turned on simultaneously increases at the linear rate, wherein said control circuit has a plurality of switching control sections which each include:

an amplifier having first and second inputs, and having an output which is coupled to said switching control output for a respective one of said second switching transistors;

a resistor coupled between a source of power and said first input of said amplifier;

a first sense transistor having a control input coupled to said output of said amplifier, said first sense transistor being coupled between ground and said first input of said amplifier; and a second sense transistor having a control input coupled to said output of said amplifier, said second sense transistor of each said switching control section being coupled between ground and the first input of the amplifier of a different said switching control section;

wherein said control circuit is operable to control said second input of each said amplifier so that said amplifiers generate respective said switching control signals according to said predetermined sequence.

2. An apparatus for controlling a motor which has a plurality of phase inputs, comprising:

a plurality of switching circuits each having a motor phase control output for a respective motor phase input, said switching circuits being coupled in parallel with each other across a source of power, wherein each said switching circuit includes first and second electronic switches which are coupled in series and which each have a control input, and wherein each said switching circuit has said motor phase control output thereof coupled to a node between said first and second electronic switches thereof; and a control circuit having a plurality of switching control outputs which are each coupled to said control input of a respective said electronic switch, said control circuit being operable to actuate and deactuate said switching control outputs in a predetermined sequence, said predetermined sequence including control of said switching control outputs for said second electronic switches in a manner causing said second electronic switches to turn on and off sequentially in a cyclic manner so that, as each said second electronic switch is turned off and another said second electronic switch is turned on, a current through the second electronic switch which is being turned off decreases at a linear rate and a current through the second electronic switch which is being turned on simultaneously increases at the linear rate, wherein said control circuit has a plurality of switching control sections which each include:

an amplifier having first and second inputs, and having an output which is coupled to said switching control output for a respective one of said second switching transistors;

a resistor coupled between a source of power and said first input of said amplifier;

a first sense transistor having a control input coupled to said output of said amplifier, said first sense transistor being coupled between ground and said first input of said amplifier; and a second sense transistor having a control input coupled to said output of said amplifier, said second sense transistor of each said switching control section being coupled between ground and the first input of the amplifier of a different said switching control section; and wherein said control circuit includes a state circuit coupled to said second input of each said amplifier, said state circuit being operable to control said second input of each said amplifier so that said amplifiers generate respective said switching control signals according to said predetermined sequence.

3. An apparatus for controlling a motor which has a plurality of phase inputs, comprising:

a plurality of switching circuits each having a motor phase control output for a respective motor phase input, said switching circuits being coupled in parallel with each other across a source of power, wherein each said switching circuit includes first and second electronic switches which are coupled in series and which each have a control input, and wherein each said switching circuit has said motor phase control output thereof coupled to a node between said first and second electronic switches thereof; and a control circuit having a plurality of switching control outputs which are each coupled to said control input of a respective said electronic switch, said control circuit being operable to actuate and deactuate said switching control outputs in a predetermined sequence, said predetermined sequence including control of said switching control outputs for said second electronic switches in a manner causing said second electronic switches to turn on and off sequentially in a cyclic manner so that, as each said second electronic switch is turned off and another said second electronic switch is turned on, a current through the second electronic switch which is being turned off decreases at a linear rate and a current through the second electronic switch which is being turned on simultaneously increases at the linear rate, wherein said control circuit includes:

a plurality of amplifiers each having an input, and each having an output coupled to said switching control output for a respective one of said second switching transistors;

a capacitor having a first end coupled to a source of power and having a second end;

a selectively actuatable buffer having an output coupled to said second end of said capacitor, said output of said buffer being in a tri-state condition when said buffer is disabled, and said buffer bringing a charge on said capacitor to a predetermined level when said buffer is enabled, said control circuit being operable to enable said buffer for a predetermined time interval before turning off each said second electronic switch;

a selectively actuatable constant current source which is coupled to said second end of said capacitor, and which is operable to discharge said capacitor at a linear rate when actuated, said control circuit being operable to enable said constant current source for a predetermined time interval when turning off each said second electronic switch;

a plurality of third electronic switches which are each coupled between said second end of said capacitor and the input of a respective said amplifier, said control circuit being operable to successively close said third electronic switches in a cyclic manner, each said third electronic switch being closed by said control circuit for a predetermined time interval while the amplifier coupled thereto turns off a respective said second electronic switch; and a plurality of fourth electronic switches which are each coupled between a source of power and the input of a respective said amplifier, each said fourth electronic switch being closed by said control circuit while the amplifier coupled thereto turns on and keeps on a respective said second electronic switch.

4. An apparatus for controlling a motor which has a plurality of phase inputs, comprising:

a plurality of switching circuits each having a motor phase control output for a respective motor phase input, said switching circuits being coupled in parallel with each other across a source of power, wherein each said switching circuit includes first and second electronic switches which are coupled in series and which each have a control input, and wherein each said switching circuit has said motor phase control output thereof coupled to a node between said first and second electronic switches thereof; and a control circuit having a plurality of switching control outputs which are each coupled to said control input of a respective said electronic switch, said control circuit being operable to actuate and deactuate said switching control outputs in a predetermined sequence, said predetermined sequence including control of said switching control outputs for said second electronic switches in a manner causing said second electronic switches to turn on and off sequentially in a cyclic manner so that, as each said second electronic switch is turned off and another said second electronic switch is turned on, a current through the second electronic switch which is being turned off decreases at a linear rate and a current through the second electronic switch which is being turned on simultaneously increases at the linear rate, wherein said control circuit includes:

a diode having an anode coupled to a source of power and having a cathode;

a resistor having a first end coupled to said cathode of said diode and having a second end;

a current setting circuit coupled between ground and said second end of said resistor;

a plurality of amplifiers each having an input, and each having an output coupled to said switching control output for a respective one of said second switching transistors;

a capacitor having a first end coupled to a source of power and having a second end;

a selectively actuatable buffer having an output coupled to said second end of said capacitor, said output of said buffer being in a tri-state condition when said buffer is disabled, and said buffer bringing a charge on said capacitor to a predetermined level when said buffer is enabled, said control circuit being operable to enable said buffer for a predetermined time interval before turning off each said second electronic switch;

a selectively actuatable constant current source which is coupled to said second end of said capacitor, and which is operable to discharge said capacitor at a linear rate when actuated, said control circuit being operable to enable said constant current source for a predetermined time interval when turning off each said second electronic switch;

a plurality of third electronic switches which are each coupled between said second end of said capacitor and the input of a respective said amplifier, said control circuit being operable to successively close said third electronic switches in a cyclic manner, each said third electronic switch being closed by said control circuit for a predetermined time interval while the amplifier coupled thereto turns off a respective said second electronic switch; and a plurality of fourth electronic switches which are each coupled between said second end of said resistor and the input of a respective said amplifier, each said fourth electronic switch being closed by said control circuit while the amplifier coupled thereto turns on and keeps on a respective said second electronic switch.

5. An apparatus for controlling a motor having a plurality of phase inputs, comprising:

a plurality of switching circuits each having a motor phase control output for a respective motor phase input, said switching circuits being coupled in parallel with each other across a power source, wherein each said switching circuit includes first and second switching transistors which are coupled in series and which each have a control input, and wherein each said switching circuit has said motor phase control output thereof coupled to a node between said first and second switching transistors thereof; and a control circuit having a plurality of switching control outputs which are each coupled to said control input of a respective said switching transistor, said control circuit being operable to actuate and deactuate said switching control outputs in a predetermined sequence which includes turning said second switching transistors on and off sequentially in a cyclic manner, wherein said control circuit includes a plurality of switching control sections which each include:

a transistor driver circuit having a transistor driver output which is said switching control output for a respective said second switching transistor;

a first sense transistor having a control input coupled to said transistor driver output of said transistor driver circuit, said first sense transistor being coupled between ground and an input to said transistor driver circuit; and a second sense transistor having a control input coupled to said transistor driver output of said transistor driver circuit, said second sense transistor being coupled between ground and an input of the transistor driver circuit in a different said switching control section;

wherein said control circuit is operable to cause each said transistor driver circuit to turn off the second switching transistor controlled thereby in a manner so that a current through the second switching transistor decreases at a linear rate, and to cause each said transistor driver circuit, in response to the second sense transistor coupled thereto from a different said switching control section which is turning off one of said second switching transistors, to turn on the second switching transistor controlled thereby in a manner so that a current through the second switching transistor which is being turned on increases at the linear rate in synchronism with the decrease in current at the linear rate through the second switching transistor which is being turned off.

6. An apparatus according to claim 5, wherein said transistor driver circuits each include: an amplifier having an output which is the transistor driver output, and having first and second inputs, said control circuit being operable to control said second input of said amplifier, and first input of said amplifier being coupled to the first sense transistor having said control input thereof controlled by said amplifier, and being coupled to the second sense transistor which is in a different said transistor driver circuit and which is coupled to said amplifier.

7. An apparatus according to claim 5, wherein said transistor driver circuits each include:

an amplifier having an output which is the transistor driver output, and having first and second inputs, said control circuit being operable to control said second input of said amplifier, and first input of said amplifier being coupled to the first sense transistor having said control input thereof controlled by said amplifier, and being coupled to the second sense transistor which is in a different said transistor driver circuit and which is coupled to said amplifier; and a shutoff transistor which is coupled between ground and said output of said amplifier, and which has a control input controlled by said control circuit, said control circuit turning on said shutoff transistor when the second switching transistor controlled by said amplifier is turned off.

8. An apparatus according to claim 5, wherein each said transistor driver circuit includes an amplifier having an input, and having an output coupled to said switching control output for a respective one of said second switching transistors; and wherein said control circuit includes:

a capacitor having a first end coupled to a source of power, and having a second end;

a selectively actuatable buffer having an output coupled to said second end of said capacitor, said output of said buffer being in a tri-state condition when said buffer is disabled, and said buffer bringing a charge on said capacitor to a predetermined level when said buffer is enabled, said control circuit being operable to enable said buffer for a predetermined time interval before turning off each said second switching transistor;

a selectively actuatable constant current source which is coupled to said second end of said capacitor, and which is operable to discharge said capacitor at a linear rate when actuated, said control circuit being operable to enable said constant current source for a predetermine time interval while turning off each said second switching transistor;

a plurality of first electronic switches which are each coupled between said second end of said capacitor and said input of a respective said amplifier, said control circuit being operable to successively close said first electronic switches in a cyclic manner, each said first electronic switch being closed by said control circuit for a predetermined time interval while the amplifier coupled thereto turns off a respective said second switching transistor; and a plurality of second electronic switches which are each coupled between a source of power and said input of a respective said amplifier, each said second electronic switch being closed by said control circuit while the amplifier coupled thereto turns on and keeps on a respective said second switching transistor.

9. A method for operating a motor control circuit having a plurality of switching circuits which are connected in parallel with each other across a source of power and which each have a motor phase control output for driving a respective phase input of a multi-phase motor, each of the switching circuits including first and second electronic switches which are coupled in series and which each have a control input, the switching circuits each having the motor phase control output thereof coupled to a node between the first and second switching circuits thereof, said method comprising the step of:

actuating and deactuating the control inputs of the first and second electronic switches according to a predetermined sequence;

wherein said step of actuating and deactuating includes the step of turning the second electronic switches on and off sequentially in a cyclic manner so that, as each of the second electronic switches is turned off and a another one of the second electronic switches is turned on, a current through the second electronic switch which is being turned off decreases at a linear rate and a current through the second electronic switch which is being turned on simultaneously increases at the linear rate, wherein said step of turning the second electronic switches on and off includes the step of:

detecting a rate of change of a current through a sense transistor coupled to the second electronic switch which is being turned off, and using the detected rate of change to control the second electronic switch which is being turned on.

10. A method for operating a motor control circuit having a plurality of switching circuits which are connected in parallel with each other across a source of power and which each have a motor phase control output for driving a respective phase input of a multi-phase motor, each of the switching circuits including first and second electronic switches which are coupled in series and which each have a control input, the switching circuits each having the motor phase control output thereof coupled to a node between the first and second switching circuits thereof, said method comprising the step of:

actuating and deactuating the control inputs of the first and second electronic switches according to a predetermined sequence;

wherein said step of actuating and deactuating includes the step of turning the second electronic switches on and off sequentially in a cyclic manner so that, as each of the second electronic switches is turned off and a another one of the second electronic switches is turned on, a current through the second electronic switch which is being turned off decreases at a linear rate and a current through the second electronic switch which is being turned on simultaneously increases at the linear rate, wherein said step of turning the second electronic switches on and off includes the steps of:

charging a capacitor to a selected voltage prior to turning off each of the second electronic switches;

thereafter discharging the capacitor so that a voltage thereon decreases linearly; and using the linearly decreasing voltage on the capacitor to cause a respective one of the second electronic switches to turn off at the linear rate.

* * * * *